(12) United States Patent  
le Bourgeois et al.

(10) Patent No.: US 11,907,084 B2
(45) Date of Patent: Feb. 20, 2024

(54) METHODS AND APPARATUS FOR DISTRIBUTED CONTROL OF VEHICLE SYSTEMS

(71) Applicant: Atlis Motor Vehicles, Inc., Mesa, AZ (US)

(72) Inventors: Benoit le Bourgeois, Mesa, AZ (US); Mark Hanchett, Mesa, AZ (US)

(73) Assignee: Atlis Motor Vechicles, Inc., Mesa, AZ (US)

( * ) Notice: Subject to any disclaimer, the term of this patent is extended or adjusted under 35 U.S.C. 154(b) by 261 days.

(21) Appl. No.: 17/494,798

(22) Filed: Oct. 5, 2021

(65) Prior Publication Data

US 2022/0260959 A1    Aug. 18, 2022

Related U.S. Application Data

(60) Provisional application No. 63/093,897, filed on Oct. 20, 2020.

(51) Int. Cl.
| | | |
|---|---|---|
| *G06F 11/00* | (2006.01) | |
| *G06F 11/20* | (2006.01) | |
| *G05B 19/05* | (2006.01) | |
| *G05B 19/048* | (2006.01) | |

(52) U.S. Cl.
CPC ........ *G06F 11/2023* (2013.01); *G05B 19/048* (2013.01); *G05B 19/058* (2013.01); *G06F 11/2035* (2013.01)

(58) Field of Classification Search
None
See application file for complete search history.

(56) References Cited

U.S. PATENT DOCUMENTS

| | | | |
|---|---|---|---|
| 9,081,653 B2* | 7/2015 | Ricci | G06F 11/3055 |
| 11,550,320 B2* | 1/2023 | Dingli | G05B 9/03 |
| 11,609,567 B2* | 3/2023 | Kim | B60W 50/029 |
| 2018/0370540 A1* | 12/2018 | Yousuf | G06F 11/1487 |
| 2021/0163026 A1* | 6/2021 | Ochida | B60W 60/0015 |

OTHER PUBLICATIONS

Google Scholar/Patents search—text refined (Year: 2023).*

* cited by examiner

*Primary Examiner* — Christopher S McCarthy
(74) *Attorney, Agent, or Firm* — IPTechLaw

(57) ABSTRACT

A vehicle includes a plurality of systems. Each system performs a function of the automobile. In an example embodiment, a plurality of system controllers, one for each system, controls the operation of the system. Each system controller controls how its corresponding system performs its function. When all system controllers are functional, a system controller generates control signals for its corresponding system. When one system controller ceased to operate, another system controller may control the system that corresponds to the failed system controller. Distributing control of systems among the various system controllers increases reliability.

17 Claims, 6 Drawing Sheets

| Status | 560 Remote/Local | 566 Control Remote |
|---|---|---|
| Functioning | 0 | 0 |
| NOT Functioning | 1 | 0 |
| Controlling Remote | 0 | 1 |

METHODS AND APPARATUS FOR DISTRIBUTED CONTROL OF VEHICLE SYSTEMS

BACKGROUND

Embodiments of the present invention relate to vehicles and in particular to controlling the systems of a vehicle.

A vehicle (e.g., truck, car, electric vehicle, boat) is comprised of multiple systems. Each system has one or more purposes. Each system performs one or more functions. Each system may be controlled to perform its function. Generally, each system has its own system controller that controls the operation of the system. In the event of failure of the system controller of one system, it would be advantageous if the system controller of a different system could control the system whose controller had failed. Distributing control of systems throughout the systems of the vehicle would increase reliability.

SUMMARY

Various embodiments of the present disclosure relate to the systems of a vehicle and the ability of the system controller of one system to control its own corresponding system and one or more different systems at the same time. If the system controller of a system fails, if there is no way to replace the functions of the failed system controller, prior to a service call with a mechanic, then the vehicle must attempt to operate without the system whose system controller is failed. If the function performed by the system with the failed system controller is vital the operation of the vehicle, the operation of the vehicle may be seriously impaired.

In an example embodiment of the present disclosure, the system controller for one system may perform the functions of the system controller of one or more other systems. Whereby, if the system controller of one system fails, the system controller from another system may control the system whose system controller has failed thereby enabling the system to continue operation and thereby enabling the vehicle to continue operation.

In another example embodiment, system controllers for two or more systems may cooperate with each other to meet peak processing demands.

BRIEF DESCRIPTION OF THE DRAWING

Embodiments of the present invention will be described with reference to the drawing, wherein like designations denote like elements, and.

DETAILED DESCRIPTION

Overview

Figure 1:
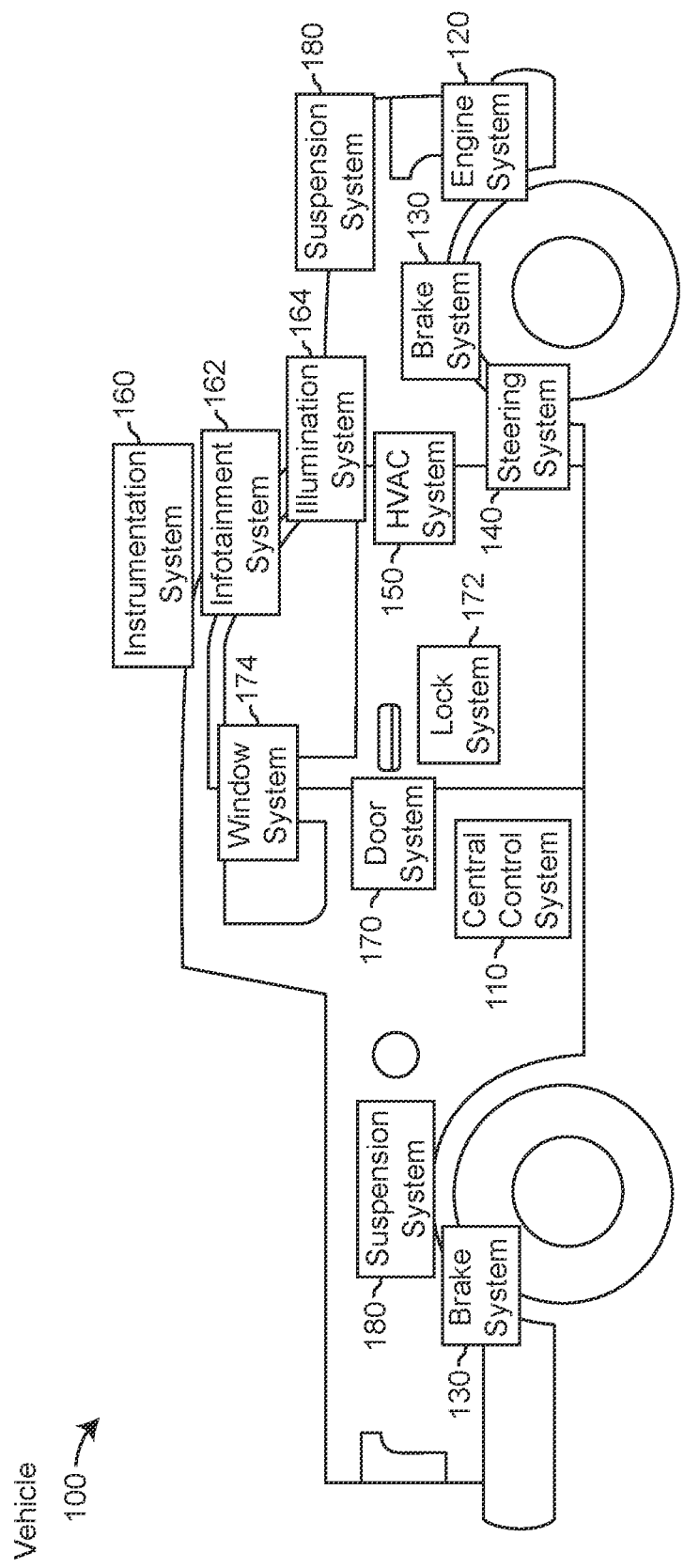
FIG. 1 is a diagram of the systems of a vehicle.

As best shown in FIG. 1, a vehicle includes a plurality of systems. Each system performs a function of the vehicle. The systems of the vehicle may include an engine system 120, a brake system 130, a steering system 140, and HVAC system 150, an instrumentation system 160, an infotainment system 162, an illumination system 164, a door system 170, a lock system 172, a window system 174, and a suspension system 180. The systems of FIG. 1 are example of systems that may be present in the vehicle, but are not exhaustive in that there may be more systems than those that are shown.

A plurality of system controllers, one for each system, controls the operation of the system corresponding to the system controller. Each system controller controls how its corresponding system performs its function. For example, an engine system controller 220 receives information from a driver (e.g., brake pedal, gas pedal), information from the engine system 120 and provides control signals to the engine system 120 to control the engine system 120 while it performs the functions of the engine system 120. In an example embodiment, each system of the vehicle has its own corresponding (e.g., respective) system controller. In another example embodiment, one or more systems may share a system controller. Each system controller may include a processing circuit for receiving data and producing (e.g., generating) the control signals needed to control the system.

During normal operation, when all system controllers are functional, a system controller controls its respective system without interference by or input from any other system controller. Normal operation refers to the situation in which all system controllers are functional. For example, the engine system controller 220 controls the engine system 120, the brake system controller 230 controls the brake system 130, the steering system controller 240 controls the steering system 140, the HVAC system controller 250 controls the HVAC system 150, and so forth. In general, the system controller 262 controls the system 260.

In the event that one of the system controllers ceases to operate (e.g., becomes nonfunctional, fails, becomes disabled), the system controller for another system may control both its own system and the system that was previously controlled by the nonfunctional system controller. For example, if the brake system controller 230 fails, the HVAC system controller 250 may control both the brake system 130 and the HVAC system 150. The HVAC system controller 250 may control both the brake system 130 and the HVAC system 150 until the vehicle owner has the opportunity to take a vehicle in for service.

In the event that the system controllers for two or more systems fail, one or more operational system controllers may control the systems whose system controllers that have failed. For example, if the HVAC system controller 250 and the steering system controller 240 have failed, the brake system controller 230 may control the HVAC system 150, the steering system 140 and the brake system 130.

Because one system controller may control its own system in addition to one or more other systems, the control of the systems of the vehicle are said to be distributed. A system controller (e.g., 220) for one system (e.g., 120) may control another system (e.g., 130) via a control bus 210. The control bus 210 is adapted to transport control signals from one system controller (e.g., 220) to a different system (e.g., 130) to control the operation of the different system (e.g., 130). For example, responsive to the failure of the brake system controller 230, the engine system controller 220 generates and provides a second plurality of control signals to the brake system 130 via controllers 200. The engine system controller also generates and provide the first plurality of control signals to the engine system 120 to control the engine system 20.

In the event of failure of two system controller (e.g., 230, 240), another system controller (e.g., 220) generates and provides the second plurality of control signals for the systems (e.g., 130, 140) corresponding to the nonfunctional system controls (e.g., 230, 240). For example, assume that brake system controller 230 and steering system controller 240 are nonfunctional. Engine controller 220 may generate and provide a second plurality of control to both the brake system 130 and the steering system 140 via control bus 210. Meanwhile the engine system controller 220 also generates control signals to control its own corresponding engine system 120.

A vehicle includes a central control system 110. The central control system 110 detects whether a system controller is functional or not functional. The central control system 110 controls access to the control bus 210. The central control system 110 determines whether the control signals (e.g., first plurality of control signals, second plurality of control signals) for a system (e.g., 120, 130) are provided by the corresponding system controller (e.g., 220, 230) or by a different system controller via the control bus 210. The cooperation between the system controllers (e.g., 220, 230, 240, 250, 262), the control bus 210 and the central control system 110 is described below in greater detail.

Systems

As discussed above, a system of the vehicle performs a function of the vehicle. The various systems perform their respective functions so that the vehicle may operate. Systems may cooperate in performing their functions. Systems may include sensors that measure the performance of the system. Systems may include actuators. An actuator may operate to instruct the system to perform a function, to continue to perform a function, to alter performance of a function, to start performing a function, and/or halt performing a function. An actuator may include electronic devices, mechanical devices and/or electromechanical devices.

The engine system 120 performs the function of moving the vehicle. The engine system 120 include one or more devices (e.g., gas engine, electric motors) that provide a force for moving the vehicle 100. The engine system 120 may include gears (e.g., transmission) for harnessing the force to move the vehicle in any direction and at any speed. The engine system 120 may include sensors that detect, inter alia, the speed of operation (e.g., rotation) of the device, the force provided by the device, the torque provided by the device, and or any other physical phenomena that may be measured. The engine system 120 may include actuators for controlling, inter alia, the operation of the devices that provide the force for moving the vehicle 100. The engine system 120 may receive information from the user (e.g., gas pedal, cruise control) and may perform its functions in accordance with the user information. As discussed in more detail below, the engine system 120 corresponds to the engine system controller 220.

The brake system 130 performs the function of slowing and/or stopping the vehicle. The brake system 130 may include any type of brake (e.g., drum, disk, air, reversing an electric motor) for slowing and/or stopping the rotation of one or more wheels of the vehicle. The rating system 130 includes any additional devices (e.g., fluid reserve, booster) needed to apply a force for slowing the rotation of the wheels. The braking system 130 may include sensors for detecting the amount of force applied to each wheel to stop the wheel. The braking system 130 may include sensors for detecting, inter alia, whether the wheel is rotating or is stopped (e.g., locked up). The braking system 130 may include actuators that, inter alia, apply and/or release the brakes. The brake system 130 may receive information from a user (e.g., brake pedal, emergency brake, drift lever) and may perform its functions in accordance with the user information. As discussed in more detail below, the brake system 130 corresponds to the brake system controller 230.

The steering system 140 performs the function of establishing and/or maintaining the direction of travel of the vehicle. The steering system 140 may include any mechanism and/or electromechanical device for orienting a wheel so that the vehicle 100 travels in a desired direction. The steering system 140 may be used by user to indicate a direction of travel of the vehicle as it is moved by the engine system 120 or slowed by the brake system 130. The steering system 140 may include sensors for detecting, inter alia, the orientation of the wheels, the orientation of the steering wheel, rotation of the steering wheel, direction of rotation of the steering wheel, and/or change in orientation of the wheels. The steering system 140 may include actuators for, inter alia, orienting the wheels and/or orienting the steering will. The steering system 140 may receive information from a user (e.g., steering wheel) and may perform its functions in accordance with the user information. As discussed in more detail below, the steering system 140 corresponds to the steering system controller 24.

The HVAC system 150 performs the function of heating, ventilating, and/or cooling (e.g., air conditioning) the interior of the vehicle, and in particular the interior of the vehicle where the driver and passengers are located. The HVAC system 150 may be separate from the engine system 120; however, the HVAC system 150 may receive power from the engine system 120 to perform the functions of the HVAC system 150. The HVAC system 150 may include sensors for detecting, inter alia, exterior atmospheric temperature, interior cabin temperature, desired temperature as set by a user, fan speed, and/or air circulation. The HVAC system 150 may include actuators for, inter alia, closing vents, opening vents, controlling energy sources to heat or cool, and/or controlling fans for providing circulation. The HVAC system 150 may receive information from a user (e.g., temperature setting, fan setting, event, recirculation) and may perform its functions in accordance with the user information. As discussed in more detail below, the HVAC system 150 corresponds to the HVAC system controller 250.

The instrumentation system 160 performs the function of providing information regarding the operation of the vehicle and/or the systems of the vehicle to a driver and/or passenger of the vehicle. The instrumentation system 160 may include sensors for detecting, inter alia, the operation of the vehicle. The instrumentation system 160 may receive information from sensors from any system. The instrumentation system 160 may include actuators for selecting information from sensors for display. The instrumentation system 160 may include one or more instrument (e.g., dials, display) for displaying information regarding the operation of the vehicle for use by the driver. The instrumentation system 160 may also provide information regarding the operation of the vehicle to other systems of the vehicle. The instrumentation system 160 corresponds to an instrumentation system controller.

The infotainment system 162 performs the function of presenting information to and receiving information (e.g., input, selections) from the driver and/or the passengers (e.g., users). For example, the infotainment system 162 presents information regarding the systems of the vehicle, the status of the systems of the vehicle, the operation of the systems of the vehicle and/or information requested by the users such as entertainment and/or educational materials (e.g., movie, radio, video, Internet). The infotainment system 162 receives information from the users to control the systems of the vehicle and/or to select the information provided. For example, the infotainment system 162 may present information regarding the operation of the HVAC system 150 and receive input, via buttons and/or controls, to set the operation of the HVAC system 150. The infotainment system 162 may present information regarding the status of the window system 174 and receive input from the users to control the windows of the vehicle 100. Information collected by the instrument system 160 may be presented to the driver via the infotainment system 162. The infotainment system 162 may present information regarding the current entertainment or educational material being provided and receive input from the users regarding new or different material to be provided.

To perform its function of providing the status of the systems of the vehicle and receiving input from the users, the infotainment system 162 may include a display (e.g., monitor, touchscreen) for presenting information and controls (e.g., push buttons, knobs, icons on a touchscreen) for receiving information from the users.

To perform its function of entertainment and/or education, the infotainment system 162 may include a radio, a television and/or display for presenting entertainment and or educational material to the users. The infotainment system 162 may include sensors for detecting, inter alia, radio signals, mobile telephone signals, insertion and/or the presence of media and/or the amount of road noise in the cabin. The infotainment system 162 may include actuators, but also may include electronic devices for signal processing. The infotainment system 162 may receive information from a user (e.g., source, volume, channel, mute) and may perform its functions in accordance with the user information. The infotainment system 162 corresponds to an infotainment system controller.

The illumination system 164 performs the function of controlling the illumination, whether interior or exterior, of the vehicle. The illumination system 164 may control the lights inside the cabin, the headlight, the parking lights, the fog light, the signal indicators, and/or any other lights associated with the vehicle. The illumination system 160 may further control the illumination of a trailer pulled by the vehicle. The illumination system 164 may include sensors for detecting, inter alia, light intensity, the presence of light, exterior atmospheric conditions such as fog or precipitation, sunlight, and/or darkness. The illumination system 164 may include actuators for, inter alia, positioning (e.g., orienting) lights, covering lights, and/or exposing lights. The illumination system 164 may receive information from a user (e.g., on, off, turn indicator) and may perform its functions in accordance with the user information. The illumination system 164 corresponds to an illumination system controller.

The door system 170 performs the function of controlling the doors of the vehicle. The door system 170 may control the doors by automatically closing the doors, automatically opening the doors, and providing a warning when a door is open and the vehicle is in motion. The door system 170 may include sensors for detecting, inter alia, open doors, closed doors, doors that are ajar, and/or blocked doors. The door system 170 may include actuators for, inter alia, closing doors and opening doors. The door system 170 may receive information from a user (e.g., doorhandle, open button, close button) and may perform its functions in accordance with the user information. The door system 170 corresponds to a door system controller.

The lock system 172 performs the function of securing the vehicle against entry. The lock system 172 may control the locks on the doors, the lock on the gas access lid, the lock on you I would try to take the slope much of the line as possible be more so if you would like you to determine the hood, and/or the lock on any rear door (e.g., trunk, tailgate). The lock system 172 may include sensors for detecting, inter alia, whether doors are locked and/or whether doors are unlocked. The door system 170 may include actuators for, inter alia, locking and unlocking doors. The lock system 172 may receive information from a user (e.g., lock button, unlock button, locking/unlocking code) and may perform its functions in accordance with the user information. The lock system 172 corresponds to a lock system controller.

The window system 174 performs the function of controlling the windows of the vehicle. The window system 174 may control the opening of the windows, the closing of the windows, the heating of the windows, and the defrosting of the windows. The window system 174 may include sensors for detecting, inter alia, whether windows are open, closed and/or partially open. The door system 170 may include actuators for, inter alia, opening and/or closing windows. The window system 174 may receive information from a user (e.g., up button, down button, heat button, defrost button) and may perform its function in accordance with the user information. The window system 174 corresponds to a window system controller.

The suspension system 180 performs the function of increasing the safe operation of the vehicle by absorbing the energy from various road bumps and other kinetic impacts between the tires and the surface over which the vehicle travels. The suspension system 180 attempts to keep the tires in contact with the road regardless of the terrain thereby increasing traction and the control a driver has over the vehicle. The suspension system 180 may control suspension components such as springs, shocks, leaf springs and/or shock absorbers. The suspension system 180 may include sensors for detecting, inter alia, movement of the tires, compression of the suspension system, decompression of the suspension system, relative movement of one tire to movement of another tire, and/or suspension stiffness. The suspension system 170 may include actuators for, inter alia, positioning component of the suspension and/or setting the stiffness of the suspension. The suspension system 180 may receive information from user (e.g., shock stiffness) and may perform its functions in accordance with the user information. The suspension system 180 corresponds to a suspension system controller.

System Controllers

As discussed above, a system controller controls the operation of a system. A system controller corresponds to a system. A system controller may receive data (e.g., information) from sensors that detect and/or monitor the operation of the system. The system controlled by the system controller may include the sensors that detect and/or monitor the operation of the system. A system controller generates control signals that control the operation of the system. A system controller may generate control signals in accordance with the sensor data that it receives the system it controls. Control signals may control actuators that control the system or cause the system to perform a function. Control of a system may include controlling the system to start, stop, continue and/or pause operation of the system. Control signals and data from sensors may be communicated between a system and a system controller via a control signal bus.

For example, the engine system controller 220 is adapted to control the engine system 120. The engine system controller 220 corresponds to the engine system 120. The engine system controller 220 generates control signals for controlling the engine system 120. The engine system controller 220 provides the control signals to the engine system 120. In an example embodiment, the engine system controller 220 provides the control signals to the engine system 120 via a control signal ("CS") bus 220CS. The engine system 120 provides data from sensors to the engine system controller 220 via the CS bus 220CS.

The brake system controller 230 is adapted to control the brake system 130. The brake system controller 230 corresponds to the engine system 130. The brake system controller 230 generates control signals for controlling the brake system 130. The brake system controller 230 provides the control signals to the brake system 130. In an example embodiment, the brake system controller 230 provides the control signals to the engine system 130 via a CS bus 230CS. The brake system 130 provides information from sensors to the brake system controller 230 via the CS bus 230CS.

The steering system controller 240 is adapted to control the steering system 140. The steering system controller 240 corresponds to the steering system 140. The steering system controller 240 generates control signals for controlling the steering system 140. The steering system controller 240 provides the control signals to the steering system 140. In an example embodiment, the steering system controller 240 provides the control signals to the steering system 140 via a CS bus 240CS. The steering system 140 provides information from sensors to the steering system controller 240 via the control signal bus 240CS.

The HVAC system controller 250 is adapted to control the HVAC system 150. The HVAC system controller 250 corresponds to the HVAC system 150. The HVAC system controller 250 generates control signals for controlling the HVAC system 150. The HVAC system controller 250 provides the control signals to the HVAC system 150. In an example embodiment, the HVAC system controller 250 provides the control signals to the steering system 150 via a CS bus 250CS. The HVAC system 150 provides information from sensors to the HVAC system controller 250 via the control signal bus 250CS.

The other systems (e.g., instrumentation system 160, infotainment system 162, illumination system 164, door system 170, lock system 172, window system 174, suspension system 180, so forth) of the vehicle 100 each include a system controller and a CS bus as represented by system controller 262 and control signal bus 260CS. The system controller 262 generates control signals that control the operation of the system 260. The sensors in the system 260 provide information to the system controller 262 via the control signal bus 260CS. The system controller 260 corresponds to the system 160.

Central Control System, RCS Bus, GCS Bus and CS Bus

As discussed above, the central control system 110 detects whether a system controller (e.g., 220, 230, 240, 250, 262) is functioning or not functioning. The central control system 110 also controls the control bus 210, which means that the central control system 110 determines how control signals are transported between system controllers. The central control system 110 also determines which system controller will provide control signals to systems whose system controllers have failed.

When all system controllers (e.g., 220, 230, 240, 250, 262) are functional, each system controller generates the control signals needed for its own system. For example, when engine system controller 220, brake system controller 230, steering system controller 240, HVAC system controller 250 and all other systems, as represented by system controller 262, are functional, the engine system controller 220 generates and provides control signals to the engine system 120 via control signal ("CS") bus 220CS. The brake system controller 230 generates and provides control signals to the braking system 130 via CS bus 230CS. The steering system controller 240 generates and provides control signals to the steering system 140 via CS bus 240CS. The HVAC system controller 250 generates and provides control signals to the HVAC system 150 via CS bus 250CS. The system controller 262, as representative of all other system controllers and systems not specifically mentioned, generates and provides control signals to system 260 via CS bus 260CS.

Each CS bus may also transport sensor data from the system to its corresponding system controller. For example, engine system 120 provides sensor data to the engine system controller 220 via the CS bus 220CS, and so forth with the other systems and system controllers of the vehicle 100.

Figure 2:
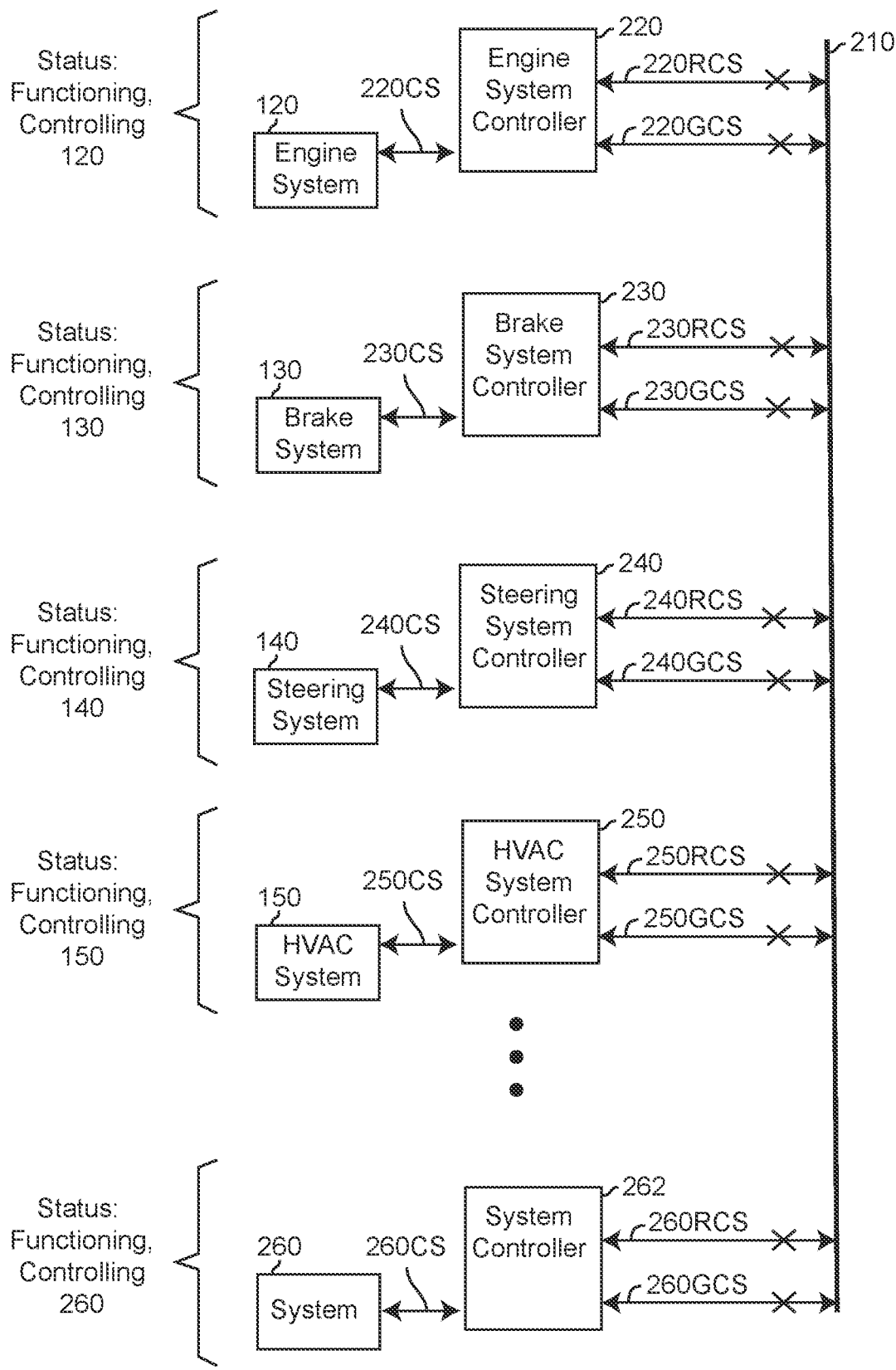
FIG. 2 is a first example diagram of distributed control.

When all system controllers are functional, as best shown in FIG. 2, control bus 210 is not used to transport control signals and/or sensor data. In fact, in an example embodiment, the central control system 110 disconnects the system controllers from the control bus 210. In essence, the engine system controller 220, the brake system controller 230, the steering system controller 240, the HVAC system controller 250 and the system controller 262 cannot provide control signals to or receive sensor data from the control bus 210. In an example embodiment, the central control system 110 disables access to the control bus 210 by disconnecting all Replacement Control Signal ("RCS") buses and Generated Control Signal ("GCS") buses from the control bus 210. In an example embodiment, the RCS buses and the GCS buses may be disconnected from the control bus 210 by placing all drivers in a high impedance (e.g., tri-state) condition.

In an example embodiment, a GCS bus is a bus that provides control signals to and receives sensor data from the control bus 210. An RCS bus is a bus that receives control signals from and provides sensor data to the control bus 210. In an example embodiment, each system controller interfaces with a separate GCS and RCS bus. Access to the control bus 210 is controlled by the central control system 110.

In another example embodiment, each system controller interfaces with a Single Control Signal ("SCS") bus. In a first mode (e.g., provide mode), the SCS bus transports control signals from a system controller to the control bus 210 and sensor data from the control bus 210 to the system controller. In a second mode (e.g., receive mode), the SCS bus transports control signals from the control bus to a system and transports sensor data from the system to the control bus 210. The first mode, the provide mode, is used for a system controller to generate control signals for a system whose corresponding system controller has failed. The second mode, the receive mode, is used by a system to receive control signals from a non-corresponding system controller because it has corresponding system controller has failed. The central control system 110 determines whether the SCS bus operates in the first mode or the second mode. For example, the central system controller 110 will instruct one SCS bus to operate in the first mode (e.g., provide) when the system controller connected to the SCS bus is generating control signals for a system other than its own. The central control system 110 will instruct another SCS bus to operate in the second mode (e.g., receive) when the system controller has failed and the system associated with the system controller needs to receive control signals via the control bus 210.

The RCS bus transports (e.g., directs) control signals from the control bus 210 to the system associated with the RCS bus. The RCS bus also transport sensor information from the system associated with the RCS bus to the control bus 210. The RCS bus is activated, by the central control system 110, for a controller that has failed so that the system associated with the failed system controller may receive control signals generated by another system controller.

Figure 3:
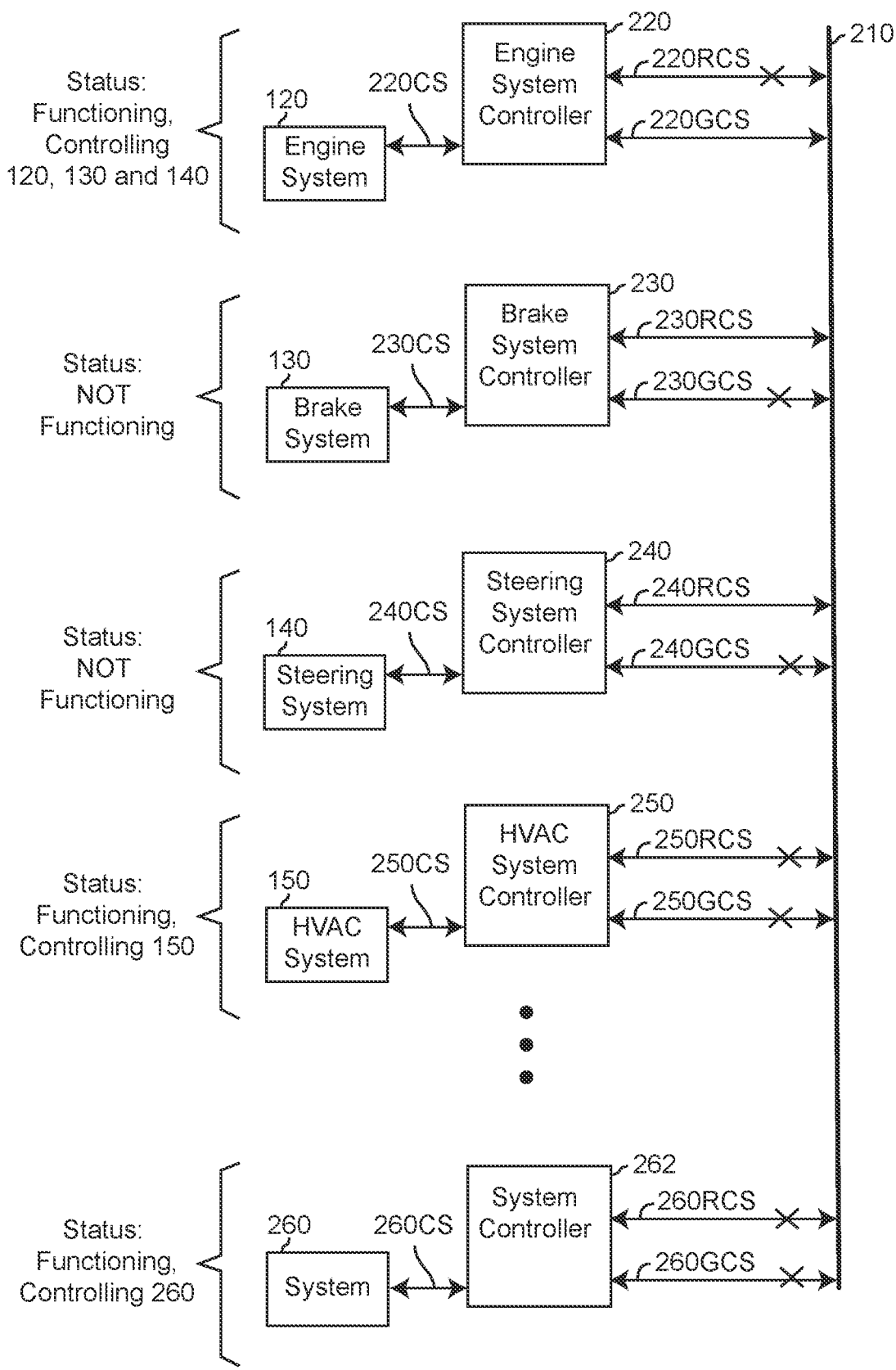
FIG. 3 is a second example diagram of distributed control.

For example, referring to FIG. 3, assume that the brake system controller 230 has ceased to operate. The central control system 110 enables the RCS bus 230RCS (note lack of X on the bus) so that control signals may be provided by the engine system controller 220 to the brake system 130 via the control bus 210, the RCS bus 230RCS, and the CS bus 230CS. Coupling the CS bus (e.g., 230CS) to the RCS bus (e.g., 230RCS) also enables the information captured by sensors in the system (e.g., 130) to be passed to the control bus 210.

Figure 4:
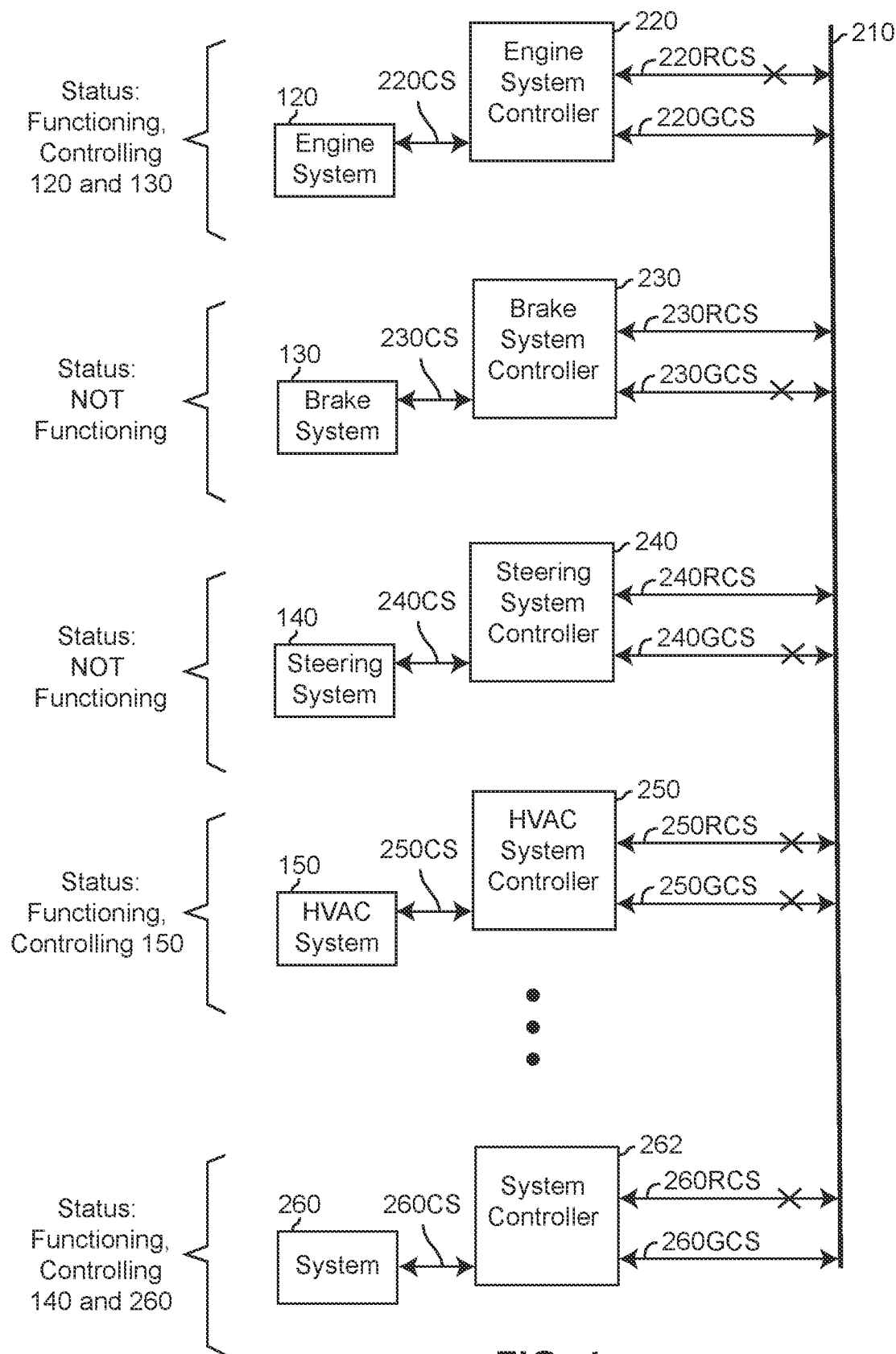
FIG. 4 is a third example diagram of distributed control.

In FIG. 3, the RCS buses are shown as being connected to a system controller yet the RCS bus is enabled by the central control system 110 only when the system controller is nonfunctional. In FIGS. 2-4, even when a system controller is nonfunctional, the system controller is able to couple the RCS bus to the CS bus so that control signals from the control bus 210 may be transported to the system that needs to receive the control signals.

In the above example, the central control system 110 enables the RCS bus 230RCS and instructs the brake system controller 230 to couple (e.g., connect) the RCS bus 230RCS to the CS bus 230CS. Enabling the RCS bus 230RCS and coupling the RCS bus 230RCS to the CS bus 230CS means that control signals may pass from the control bus 210 to the brake system 130 and sensor data (e.g., information) may pass from the brake system 130 to the control bus 210.

The GCS bus transports control signals generated by a functioning system controller to the control bus 210 for transport to a system that is associated with a nonfunctioning system controller. The system associated with the nonfunctioning system controller provides sensor data to the control bus 210 which is transported to the functioning system controller via its GCS bus, so the sensor data may be used to generate control signals. The central control system 110 controls whether the GCS bus has access to the control bus 210.

For example, referring to FIG. 3, the engine system controller 220 is a functioning system controller. The central control system 110 has determined that a least one system controller (e.g., brake system controller 230) is nonfunctional. The central control system 110 has determined that the engine system controller 220 may generate the control signals needed by the brake system 130. The central control system 110 enables the GCS bus 220GCS so that the engine system controller 220 may generate the control signals needed by the brake system 130 and provide those control signals to the control bus 210. The control signals generated by the engine system controller 220 are transported to the brake system via the GCS bus 220GCS, the control bus 210, the RCS bus 230RCS and the CS bus 230CS. The sensor data detected by the brake system 130 is transported to the engine system controller 220 via the CS bus 230CS, the RCS bus 230RCS, the control bus 210 and the GCS bus 220GCS.

In the above example, even though the engine system controller 220 generates the control signals for the brake system 130, the engine system controller 220 also generates the control signals for the engine system 120 at the same time. So, the engine system controller 220 generates the control signals (e.g., a first plurality of control signals) for the engine system 120 and provides the control signals to the engine system 120 via the CS bus 220CS. The engine system controller 220 also generates control signals (e.g., a second plurality of control signals) for the brake system 130 and provides the control signals to the brake system 130 via the GCS bus 220GCS, the control bus 210, RCS bus 230RCS and the CS bus 230CS.

Further Examples of Distributed Control

The example scenarios illustrated in FIGS. 2-4 show how control may be distributed so that the functions of a disabled (e.g., malfunctioning, failed) system controller may be replaced by another functioning system controller. As discussed above, FIG. 2 shows the operation of the systems of the vehicle 100 when all system controllers (e.g., 200, 230, 240, 250, 262) are functional. In this example, the central control system 110 detects that all system controllers (e.g., 220, 230, 240, 250, 262) are functional and can generate the control signals for and receive the sensor data from their corresponding systems (e.g., 120, 130, 140, 150, 260). Having detected that all system controllers are functional, the central control system 110 disables access of the RCS buses (e.g., 220RCS, 230RCS, 240RCS, 250RCS, 260RCS) and GCS buses (e.g., 220GCS, 230GCS, 240GCS, 250GCS, 260GCS) to the control bus 210. The symbol "X" on the RCS and GCS buses indicates that they are disabled and cannot access (e.g., drive, read from) the control bus 210 and that the control bus 210 cannot access the RCS and GCS buses. In a situation in which all system controllers are functional, no control signals and/or sensor data are transported by the control bus 210.

When all system controllers are functional, each system controller generates the control signals used by their respective systems. For example, the engine system controller 220 generates the control signals used by engine system 120. The engine system controller 220 provides the control signals to the engine system 120 via the CS bus 220CS. The engine system controller 220 also receives sensor data from the engine system 120 via the CS buss 220CS. The brake system controller 230 generates and provides control signals to and receives sensor data from the brake system 130 via the CS bus 230CS, and so forth for the steering system controller 240 and steering system 140, the HVAC system controller 250 and HVAC system 150, and system controller 262 and system 260.

In the example scenario shown in FIG. 3, the engine system controller 220, the HVAC system controller 250 and the system controller 262 are functioning system controllers. The brake system controller 230 and the steering system controller 240 are non-functioning system controllers. When the central control system 110 determines that there are non-functioning system controllers, it also determines which system controller will generate the signals needed by the systems associated with a non-functioning system controller. In the example of FIG. 3, the central control system 110 determines that the engine system controller 220 will generate and provide the control signals for both the brake system 130 and the steering system 140. In other words, the engine system controller 220 will replace both the brake system controller 230 and the steering system controller 240.

In an example embodiment, any system controller may generate the control signals for one or more other systems in addition to its own system. In another example embodiment, some system controllers may generate the control signals for other systems, but not all systems; however, there is some redundancy for all system controllers. For example, in an example embodiment, the engine system controller 220, brake system controller 230, and steering system controller 240 may generate control signals for its own system (e.g., engine system 120, brake system 130, steering system 140) respectively, one other major system (e.g., engine system 120, brake system 130, steering system 140), and one or more other minor systems (e.g., door system 170, lock system 172, window system 174, instrumentation system 160, infotainment system 162, illumination system 164, HVAC system 150), but not two or more major systems. For example, in this example embodiment, the engine system controller 220 may generate control signals for the brake system 130 or the steering system 140, but not both.

The central control system 110 also determines that the functioning system controllers will control their own respective systems. So, the engine system controller 220 will generate and provide control signals for the engine system 120 via the CS bus 220CS. The HVAC system controller 250 will generate and provide control signals for the HVAC system 150 via the CS bus 250CS. The system controller 262 will generate and provide the control signals for the system 260 via the CS bus 260CS. The system controllers (e.g., 220, 230, 240, 250, 262) and the systems (e.g., 120, 130, 140, 150, 260) are representative of any one of the system controllers and systems that are not expressly described.

In this example, since the HVAC system controller 250 and the system controller 262 will be generating the control signals for their respective systems only, and not for any other system, their respective GCS buses 250GCS and 260GCS are disabled since they do not need to provide control signals to the control bus 210 for any other system. Further, since HVAC system controller 250 and the system controller 262 will be generating the control signals for their own respective systems, their respective systems do not need to receive control signals from the control bus 210 via their respective RCS buses, so the RCS buses 250RCS and 262RCS are also disabled. Further, the HVAC system controller 250 and the system controller 262 will receive sensor data directly from their respective systems, HVAC system 150 and system 260 respectively, via their respective CS buses 250CS and 260CS.

The central control system 110 enables the GCS bus 220GCS for the engine system controller 220 so that it may provide control signals to the control bus 210 for the brake system 130 and the steering system 140. The lack of the "X" on the GCS bus 220GCS in FIG. 3 indicates that it is enabled. The central control system 110 also enables the RCS buses 230RCS and 240RCS for the brake system controller 230 and the steering system controller 240 respectively so that the brake system 130 and the steering system 140 may receive control signals via RCS buses 230RCS and 240RCS. The lack of the "X" on the RCS buses 230RCS and 240RCS in FIG. 3 indicate that they are enabled.

The engine system controller 220 provides control signals for the engine system 120 via the CS bus 220CS. The engine system controller 230 also provides control signals for the brake system 130 and the steering system 140 to the control bus 210 via the GCS bus 220GCS. The RCS buses 230RCS and 240RCS transport control signals from the control bus 210 to the brake system 130 and the steering system 140 respectively via the CS buses 230CS and 240CS respectively. The RCS buses 230RCS and 240RCS transport sensor data from the brake system 130 and the steering system 140 respectively to the control bus 210 via the CS buses 230CS and 240CS respectively. The engine system controller 220 receives the sensor data from the brake system 130 and the steering system 140 via the control bus 210 and the GCS bus 220GCS.

The control bus 210 may transport control signals and/or sensor data between system controllers and/or systems in any manner. In an example embodiment, control signals and/or sensor data are packetized for transport over the control bus 210. A packet may include information as to the system or the system controller that should receive the control signals or sensor data respectively. Upon receiving a packet of control signals, the system may unpack the packet and applied control signals to the system to control the system and/or unpack the sensor data and use the sensor data to generate control signals.

In another example embodiment, the control bus is a synchronous bus that reserves timeslots for each system of the vehicle 100. Timeslots may be allocated per system for control signals and/or sensor data. The system controller generating the control signals places the control signals in the timeslot for the intended (e.g., recipient) system. The system receiving control signal places sensor data in a timeslot intended for the system controller generating the control signals. In another example embodiment, control signals and/or sensor data unique to a specific system are transported by specific traces (e.g., address lines, data lines) of the control bus 210.

In the example scenario shown in FIG. 4, the engine system controller 220, the HVAC system controller 250 and the system controller 262 are functioning system controllers. The brake system controller 230 and the steering system controller 240 are non-functioning system controllers. When the central control system 110 determines that there are non-functioning system controllers, it also determines which system controller will generate the signals needed by the systems associated with a non-functioning system controller. In the example of FIG. 4, the central control system 110 determines that the engine system controller 220 will generate and provide the control signals for the brake system 130 and the system controller 262 will generate and provide the control signals for the steering system 140. In other words, the engine system controller 220 will replace the brake system controller 230 and the system controller 262 will replace the steering system controller 240.

The central control system 110 also determines that the functioning system controllers will control their own respective systems. So, the engine system controller 220 will generate and provide control signals for the engine system 120 via the CS bus 220CS. The HVAC system controller 250 will generate and provide control signals for the HVAC system 150 via the CS bus 250CS. The system controller 262 will generate and provide the control signals for the system 260 via the CS bus 260CS.

Since the HVAC system controller 250 will be generating the control signals for its corresponding system only, and not for any other system, the GCS bus 250GCS may be disabled since the HVAC system controller 250 does not need to provide control signals to the control bus 210 for use by some other system. Further, since the HVAC system controller 250 will be generating the control signals for its own system, the HVAC system 150 does not need to receive control signals from the control bus 210 via its RCS bus, so the RCS bus 250RCS is disabled. Further, the HVAC system controller 250 will receive sensor data directly from HVAC system 150, so the RCS bus 250RCS may be disabled.

The central control system 110 enables the GCS buses 220GCS and 260GCS for the engine system controller 220 and the system controller 262 respectively so they may provide control signals to the control bus 210 for the brake system 130 and the steering system 140 respectively. The lack of the "X" on the GCS buses 220GCS and 260GCS in FIG. 4 indicates that they are enabled. The central control system 110 also enables the RCS buses for the brake system controller 230 and the steering system controller 240 so that the brake system 130 and the steering system 140 may receive control signals via RCS buses 230RCS and 240RCS respectively. The lack of the "X" on the RCS buses 230RCS and 240RCS in FIG. 4 indicate that they are enabled.

The engine system controller 220 provides control signals to the engine system 120 via the CS bus 220CS. The engine system controller 220 also generates the control signals for the brake system 130. The engine system controller 220 provides the control signals for the brake system 130 to the control bus 210 via the GCS bus 220GCS. The control signals for the brake system 130 travel from the control bus 210 to the brake system 130 via the RCS bus 230RCS and the CS bus 230CS. The brake system 130 provides sensor data to the engine system controller 220 via the CS bus 230CS, the RCS bus 230RCS, the control bus 210 and the GCS bus 220GCS.

The system controller 262 provides control signals to the system 260 via the CS bus 260CS. The system controller 262 also generates the control signals for the steering system 140. The system controller 262 provides the control signals for the steering system 140 to the control bus 210 via the GCS bus 260GCS. The control signals for the steering system 140 travel from the control bus 210 to the steering system 140 via the RCS bus 240RCS and the CS bus 240CS. The steering system 140 provides sensor data to the system controller 262 via the CS bus 260CS, the RCS bus 260RCS, the control bus 210 and the GCS bus 260GCS.

In general, a system controller may generate control signals for another system (e.g., not its corresponding system) and may provide the control signals to the control bus via a GCS bus. A system, whose related system controller is nonfunctional, may receive control signals from the control bus 210 via its RCS bus and CS bus. A system, whose related system controller is nonfunctional, may provide sensor data to the control bus 210 via its CS bus and RCS bus. A system controller that is generating control signals for another system may receive the sensor data from the other system via its GCS bus.

The central control system 110 determines which system controller will provide control signals to one or more systems other than its own. The central control system 110 determines which systems will receive control signals from a system controller other than its corresponding system controller. The central control system 110 determines which systems will provide sensor data to a system controller other than its corresponding system controller. The central control system 110 controls access to the control bus 210 to accept generated control signals from one system controller for delivery to another system. The central control system 110 controls access to the control bus 210 to provide control signals to a system.

The central control system 110 may monitor the operation and/or health of each system controller to determine when the functions of any particular system controller need to be replaced by another system controller. The central control system 110 determines how the control of the various systems of the vehicle 100 will be distributed and/or provided by the various system controllers.

First Example Embodiment

In a first example embodiment, the vehicle 100 comprises a plurality of systems (e.g., 120, 130, 140, 150, 160, 162, 164, 170, 172, 174, 180), a plurality of system controllers (e.g., 220, 230, 240, 250, 262), and a control bus 210. Each system (e.g., 120, 130, 140, 150, 160, 162, 164, 170, 172, 174, 180) of the plurality of systems adapted to perform a function (e.g., engine, brake, steering, HVAC, instrumentation, infotainment, illumination, door, lock, window, suspension) of the vehicle 100. Each system controller (e.g., 220, 230, 240, 250, 262) of the plurality of system controllers is adapted to be connected to one system respectively so that each system controller corresponds to one system respectively. Each system controller is adapted to generate a first plurality of control signals respectively. Each system controller is adapted to provide its respective first plurality of control signals to its corresponding system to control an operation of its corresponding system. Each system controller further adapted to generate a second plurality of control signals to control an operation of one or more other systems. The control bus 210 is adapted to be connected to each system (e.g., 120, 130, 140, 150, 160, 162, 164, 170, 172, 174, 180) of the plurality of systems. The control bus 210 is further adapted to be connected to one or more system controllers (e.g., 220, 230, 240, 250, 262) of the plurality of system controllers. The control bus 210 is adapted to transport the second plurality of control signals from one system controller to one or more other systems.

In the first example embodiment, during normal operation, each system controller generates and provides the respective first plurality of control signals to its respective system. Responsive to a failure of a first system controller (e.g., 230) of the plurality, a second system controller (e.g., 220) of the plurality generates and provides the second plurality of control signals to the system (e.g., 130) corresponding to the first system controller (e.g., 230) via the control bus 210. The second plurality of control signals control the operation of the system (e.g., 130) corresponding to the first system controller (e.g., 230). The second system controller (e.g., 220) further generates and provides the respective first plurality of control signals to its corresponding system (e.g., 120).

Responsive to the failure of a third system controller (e.g., 240) of the plurality of the system controllers, the second system controller (e.g., 220) further generates and provides the second plurality of control signals to the system (e.g., 140) corresponding to the third system controller (e.g., 240) via the control bus 210 whereby the second plurality of control signals further controls the operation of the system (e.g., 140) corresponding to the third system controller (e.g., 240). The second system controller (e.g., 220) further generates and provides the respective first plurality of control signals to its corresponding system (e.g., 120).

The first example embodiment further comprises a central control system 110. The central control system 110 detects the failure of the first system controller (e.g., 230). Responsive to detecting the failure of the first system controller (e.g., 230), the central control system 110 assigns the second system controller (e.g., 220) to generate the second plurality of control signals. The central control system 110 controls the control bus 210 to transport the second plurality of control signals from the second system controller (e.g., 220) to the system (e.g., 130) that corresponds to the first system controller (e.g., 230).

In the first example embodiment, each system controller (e.g., 220, 230, 240, 250, 262) of the plurality includes a translator (e.g., 610) respectively. During normal operation, each system controller provides the respective first plurality of control signals to its corresponding system (e.g., 120, 130, 140, 150, 160, 162, 164, 170, 172, 174, 180) via its corresponding translator (e.g., 610). Responsive to the failure of the first system controller (e.g., 230), the second system controller (e.g., 220) provides the second plurality of control signals to the system (e.g., 130) corresponding to the first system controller (e.g., 230) via the control bus 210 and the translator (e.g., 610) of the first system controller (e.g., 230).

The first example embodiment further includes a central control system 110. The central control system 110 detects the failure of the first system controller (e.g., 230). The central control system 110 assigns the second system controller (e.g., 220) to generate and provide the second plurality of control signals. The central control system 110 controls the control bus 210 and the translator (e.g., 610) of the first system controller (e.g., 230) to transport the second plurality of control signals from the second system controller (e.g., 220) to the system (e.g., 130) that corresponds to the first system controller (e.g., 230).

Each system controller (e.g., 220, 230, 240, 250, 262) of the plurality of system controllers includes a tri-state buffer (e.g., 640) respectively that connects the system controller (e.g., 220, 230, 240, 250, 262) to the control bus 210. During normal operation, the tri-state buffer (e.g., 640) for each system controller is placed in a high impedance condition whereby the system controllers cannot access the control bus 210. Responsive to the failure of the first system controller (e.g., 230), the tri-state buffer (e.g., 640) of the second system controller (e.g., 220) is placed in a low impedance condition whereby the second system controller (e.g., 220) generates and provides the second plurality of control signals to the system (e.g., 130) corresponding to the first system controller (e.g., to hunt 30) via the tri-state buffer (e.g., 640) and the control bus 210.

The central control system 110 detects the failure of the first system controller (e.g., 230). The central control system 110 assigns the second system controller (e.g., 220) to generate and provide the second plurality of control signals. The central control system 110 controls the control bus 210 and the tri-state buffer (e.g., 640) of the second system controller (e.g., 220) to transport the second plurality of control signals from the second system controller (e.g., 220) to the system (e.g., 130) that corresponds to the first system controller (e.g., 230).

Second Example Embodiment

In a second example embodiment, the vehicle 100 comprises a first system (e.g., 120), a second system (e.g., 130), a control bus 210, a first system controller (e.g., 220) and a second system controller (e.g., 230).

The first system (e.g., 120) is adapted to be connected to the control bus 210. The first system (e.g., 120) is adapted to perform a first function (e.g., engine) of the vehicle 100. The second system (e.g., 130) is adapted to be connected to the control bus 210. The second system (e.g., 130) is adapted to perform a second function (e.g., brake) of the vehicle 100.

The first system controller (e.g., 220) is adapted to be connected to the first system (e.g., 120) via a first bus (e.g., 220CS). The first system controller (e.g., 220) is further adapted to be connected to the control bus 210. The first system controller (e.g., 220) is adapted to provide a first plurality of control signals to the first system (e.g., 120) via a first bus (e.g., 220CS). The first system controller (e.g., 220) is further adapted to provide a second plurality of control signals to the second system (e.g., 130) via the control bus 210. The first plurality of control signals is for controlling the first system (e.g., 120) to perform the first function (e.g., engine).

The second system controller (e.g., 230) is adapted to be connected to the second system (e.g., 130) via a second bus (e.g., 230CS). The second system controller (e.g., 230) is further adapted to be connected to the control bus 210. The second system controller (e.g., 230) is adapted to provide the second plurality of control signals to the second system (e.g., 130) via a second bus (e.g., 230CS). The second system controller (e.g., 230) is further adapted to provide the first plurality of control signals to the first system (e.g., 120) via the control bus 210. The second plurality of control signals is for controlling the second system (e.g., 130) to perform the second function (e.g., brake). The control bus 210 is adapted to transport the first plurality of control signals and the second plurality of control signals to the first system (e.g., 120) and the second system (e.g., 130) respectively.

During normal operation, the first system controller (e.g., 220) provides the first plurality of control signals to the first system (e.g., 120) via the first bus (e.g., 220CS) and the second system controller (e.g., 230) provides the second plurality of control signals to the second system (e.g., 130) via the second bus (e.g., 230CS).

Responsive to a failure of the first system controller (e.g., 220), the second system controller (e.g., 230) provides the second plurality of control signals to the second system (e.g., 130) via the second bus (e.g., 230CS) and the first plurality of control signals to the first system (e.g., 120) via the control bus 210 and the first bus (e.g., 220CS).

Responsive to a failure of the second system controller (e.g., 230), the first system controller (e.g., 220) provides the first plurality of control signals to the first system (e.g., 120) via the first bus (e.g., 220CS) and the second plurality of control signals to the second system (e.g., 130) via the control bus 210 and the second bus (e.g., 230CS).

During normal operation, the first system controller (e.g., 220) and the second system controller (e.g., 230) do not generate the second plurality of control signals and the first plurality of control signals respectively, whereby no plurality of control signals is provided via the control bus 210.

During normal operation, the first system controller (e.g., 220) and the second system controller (e.g., 230) generate only the first plurality of control signals and the second plurality of control signals respectively.

Responsive to the failure of the first system controller (e.g., 220), the second system controller (e.g., 230) is adapted to generate the second plurality of control signals and the first plurality of control signals. Responsive to the failure of the second system controller (e.g., 230), the first system controller (e.g., 220) is adapted to generate the first plurality of control signals and the second plurality of control signals.

The vehicle 100 further comprises a central control system 110. The central control system 110 adapted to detect the failure of the first system controller (e.g., 220) and/or the second system controller (e.g., 230). The central control system 110 is adapted to control access to the control bus 210, the first bus (e.g., 220CS), and the second bus (e.g., 230CS). During normal operation, the central control system 110 prevents the first system controller (e.g., 220) and the second system controller (e.g., 230) from driving the control bus 210. Responsive to a failure of the first system controller (e.g., 220), the central control system 110 enables the second system controller (e.g., 230) to drive the first plurality of control signals onto the control bus 210 and the control bus 210 to drive the first bus (e.g., 220CS). Responsive to a failure of the second system controller (e.g., 230), the central control system 110 enables the first system controller (e.g., 220) to drive the second plurality of control signals onto the control bus 210 and the control bus 210 to drive the second bus (e.g., 230CS).

The first system controller (e.g., 220) includes a first translator (e.g., 610) and a first processing circuit (e.g., 620). The second system controller (e.g., 230) includes a second translator (e.g., 610) and a second processing circuit (e.g., 620). The central control system 110 is adapted to couple the first processing circuit to the first bus (e.g., 220CS) or the control bus 210 to the first bus (e.g., 220CS) via the first translator and the second processing circuit to the second bus (e.g., 230CS) or the control bus 210 to the second bus (e.g., 230CS) via the second translator. During normal operation, the central control system 110 controls the first translator and the second translator to connect the first processing circuit to the first bus (e.g., 220CS) and the second processing circuit to the second bus (e.g., 230CS) respectively, whereby the first processing circuit provides the first plurality of control signals to the first system (e.g., 120) via the first bus (e.g., 220CS) and second processing circuit provides the second plurality of control signals to the second system (e.g., 130) via the second bus (e.g., 230CS).

The first system controller (e.g., 220) and the second system controller (e.g., 230) further include a first tri-state buffer (e.g., 640) and a second tri-state buffer (e.g., 640) respectively. The central control system 110 is adapted to couple the first processing circuit to the first bus (e.g., 220CS) or the control bus 210 to the first bus (e.g., 220CS) via the first translator, the second processing circuit to the second bus (e.g., 230CS) or the control bus 210 to the second bus (e.g., 230CS) via the second translator, the first processing circuit to the control bus 210 via the first tri-state buffer, and the second processing circuit to the control bus 210 via the second tri-state buffer. During normal operation, the central control system 110 controls the first translator and the second translator to connect the first processing circuit to the first bus (e.g., 220CS) and the second processing circuit to the second bus (e.g., 230CS) respectively, whereby the first processing circuit provides the first plurality of control signals to the first system (e.g., 120) via the first bus (e.g., 220CS) and second processing circuit provides the second plurality of control signals to the second system (e.g., 130) via the second bus (e.g., 230CS). During normal operation, the central control system 110 further controls the first tri-state buffer and the second tri-state buffer to disconnect the first processing circuit from the control bus 210 and the second processing circuit from the control bus 210 respectively, whereby no control signal is provided via the control bus 210.

Responsive to the failure of the first system controller (e.g., 220), the central control system 110 controls the first translator and the second translator to connect the control bus 210 to the first bus (e.g., 220CS) and the second processing circuit to the second bus (e.g., 230CS) respectively, whereby the second processing circuit provides the second plurality of control signals to the second system (e.g., 130) via the second bus (e.g., 230CS). Responsive to the failure of the first system controller (e.g., 220), the central control system 110 further controls the first tri-state buffer and the second tri-state buffer to disconnect the first processing circuit from the control bus 210 and to connect the second processing circuit to the control bus 210 respectively whereby the second processing circuit provides the first plurality of control signals to the first system (e.g., 120) via the control bus 210 and the first bus (e.g., 220CS).

Responsive to the failure of the second system controller (e.g., 230), the central control system 110 controls the first translator and the second translator to connect the first processing circuit to the first bus (e.g., 220CS) and the control bus 210 to the second bus (e.g., 230CS) respectively, whereby the first processing circuit provides the first plurality of control signals to the first system (e.g., 230) via the first bus (e.g., 220CS).

Responsive to the failure of the second system controller (e.g., 230), the central control system 110 further controls first tri-state buffer and the second tri-state buffer to connect the first processing circuit to the control bus 210 and to disconnect the second processing circuit from the control bus 210 whereby the first processing circuit provides the second plurality of control signals to the second system (e.g., 130) via the control bus 210 and the second bus (e.g., 230CS).

Third Example Embodiment

In a third example embodiment, the vehicle 100 comprises a first system (e.g., 150), a second system (e.g., 260), a control bus 210, a first system controller (e.g., 250) a second system controller (e.g., 262) and a central control system 110. The first system (e.g., 150) is adapted to perform a first function of the vehicle 100 in response to a first plurality of control signals. The second system (e.g., 260) is adapted to perform a second function of the vehicle 100 in response to a second plurality of control signals. The control bus 210 is adapted to transport the first plurality and the second plurality of control signals to the first system or the second system.

The first system controller (e.g., 260) includes a first translator (e.g., 610), a first processing circuit (e.g., 620), a first bus (e.g., 250CS), and a first tri-state buffer (e.g., 640). The first translator couples to the first processing circuit, the control bus 210, the first bus (e.g., 250CS) and the central control system 110. The first tri-state buffer couples to the first processing circuit, the control bus 210 and the central control system 110.

The second system controller (e.g., 262) includes a second translator (e.g., 610), a second processing circuit (e.g., 620), a second bus (e.g., 260CS), and a second tri-state buffer (e.g., 640). The second translator couples to the second processing circuit, the control bus 210, the second bus (e.g., 260CS) and the central control system 110. The second tri-state buffer couples to the second processing circuit, the control bus 210 and the central control system 110.

The central control system 110 is adapted to control access to the control bus 210, the first bus (e.g., 250CS), and the second bus (e.g., 260CS).

During normal operation, the central control system 110 controls the first translator to couple the first processing circuit to the first bus (e.g., 250CS), the second translator to couple the second processing circuit to the second bus (e.g., 260CS). The central control system 110 further controls the first tri-state buffer to disconnect the first processing circuit from the control bus 210 and the second tri-state buffer to disconnect the second processing circuit from the control bus 210. Whereby the first processing circuit provides the first plurality of control signals to the first system (e.g., 150) via the first bus (e.g., 250CS), the second processing circuit provides the second plurality of control signals to the second system (e.g., 260) via the second bus (e.g., 260CS), and the control bus 210 does not transport the first plurality of control signals or the second plurality of control signals.

Fourth Example Embodiment

Figure 5:
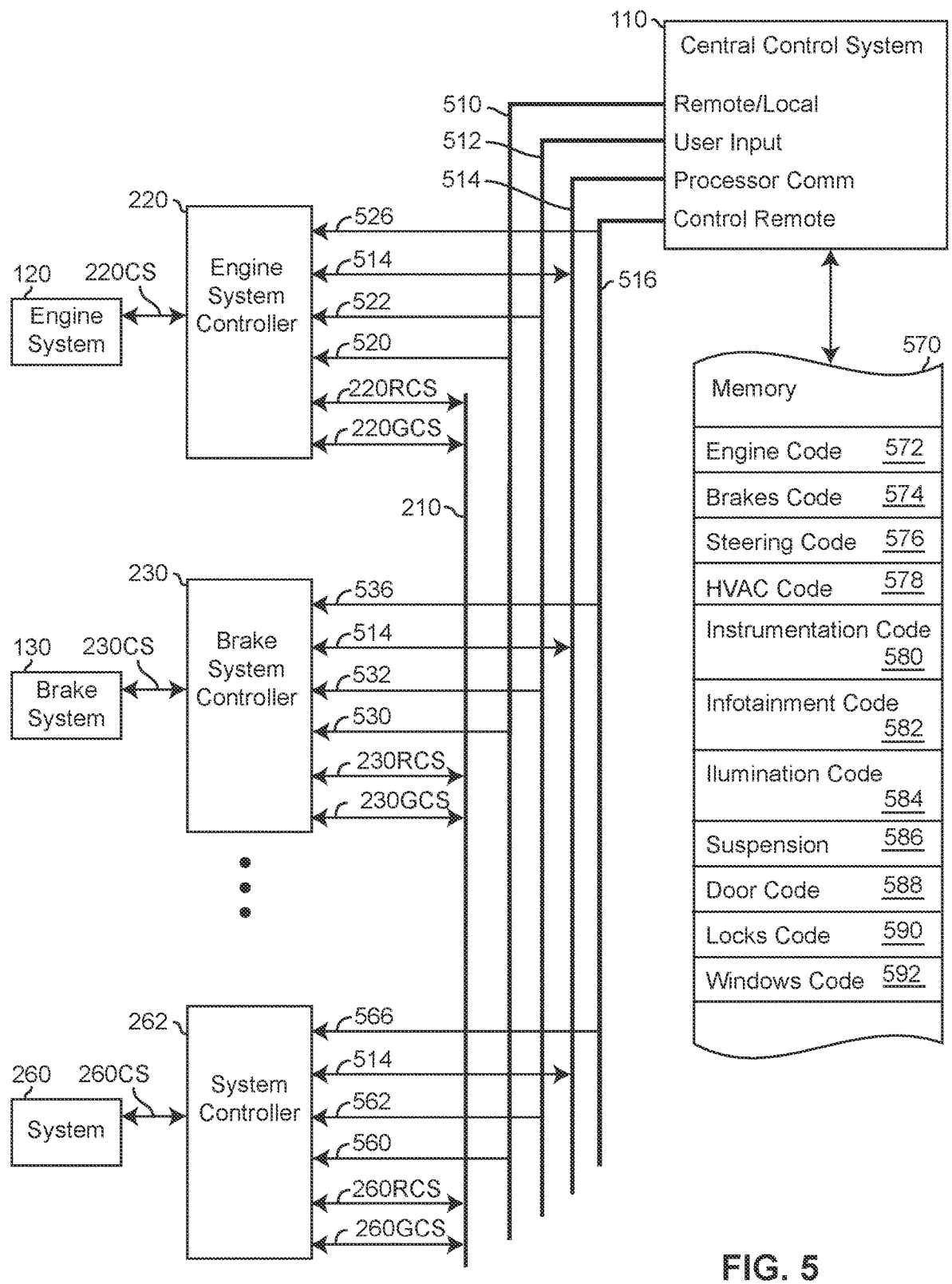
FIG. 5 is a diagram of an example embodiment of a system for distributed control.
Figures 6, 7:
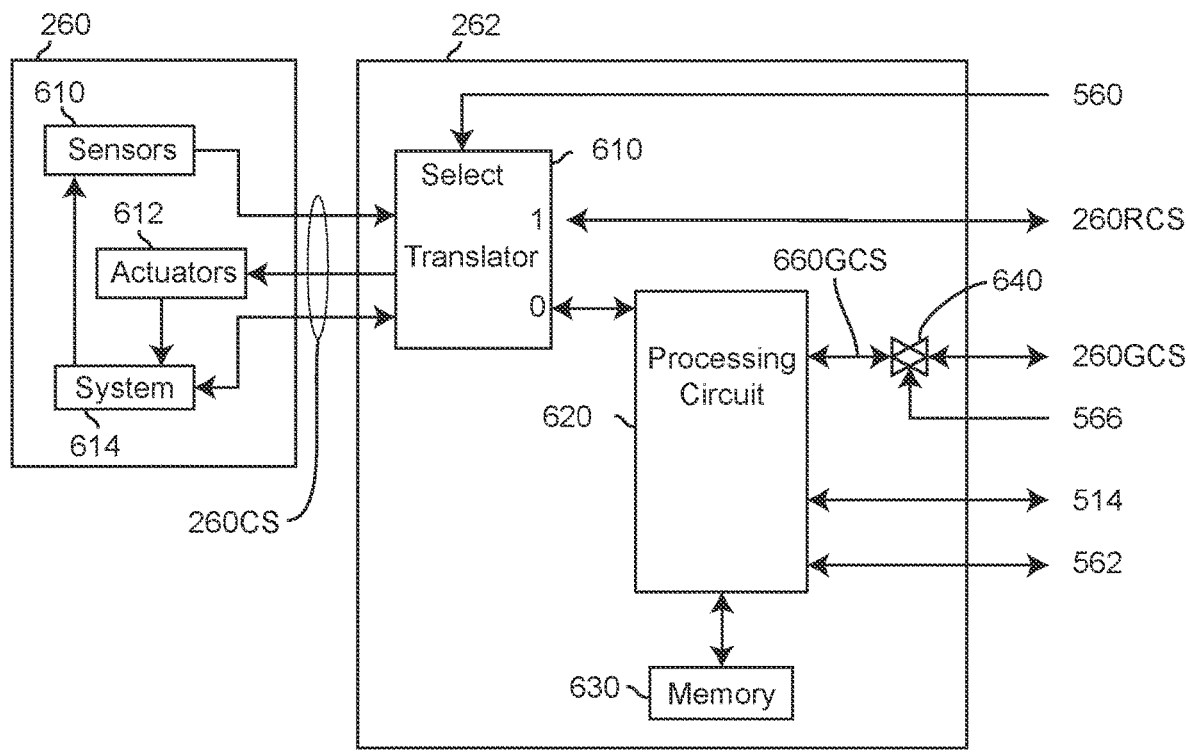
FIG. 6 is a diagram of an example embodiment of a system controller and a corresponding system.
FIG. 7 is a truth table of example control signals of an embodiment of a central control system.

A fourth example embodiment of a system of distributed control is shown in FIGS. 5-7. The embodiment shows engine system controller 220 and engine system 120, brake system controller 230 and brake system 130, and system controller 262 and system 260. These system controllers and systems are representative of the other system controllers and systems that are not expressly discussed. An example embodiment of the system controller 262 is shown in FIG. 6. The example embodiment of the system controller 262 is representative of any of the other system controllers, for example, engine system controller 220 and brake system controller 230.

The central control system 110 operates as discussed above to determine which system controllers are functioning and which system controllers are not functioning. The central control system 110 then determines which system controllers should have access to control bus 210, which system controllers should generate control signals for one or more other systems other than their own corresponding system, and which system should receive control signals from a system controller other than its own corresponding system controller. The embodiment identifies example control signals that may be issued by the central control system 110 and their effect on the example embodiment of the system controller 262.

In this example embodiment, the central control system 110 provides a plurality of remote/local control signals 510 and a plurality of control remote signals 516. The example embodiment further includes a processor communication bus 514 that enables the central control system 110 to communicate with, monitor and/or control the system controllers. The processor communication bus 514 is separate from the control bus 210. The processor communication bus 514 does not carry control signals and/or sensor data to or from systems.

The example embodiment of system controller 262, as best shown in FIG. 6, includes translator 610, processing circuit 620, memory 630, and tri-state buffer 640. Processing circuit 620 includes any type of circuit capable of executing a stored program, such as a signal processor, a microprocessor and a microcontroller along with any other circuit needed to perform the functions of the system controller 262. The memory 630 is any type of memory including a semiconductor memory. The memory 620 stores the program executed by the processing circuit 620. The program executed by the processing circuit 620 may be loaded into memory 630 via the processor communication bus 514. The central control system 110 may load the program executed by processor 620 into the memory 630. The memory 620 may also store data generated and/or used by the processing circuit.

The translator 610 transports control signals from the processing circuit 620 to the system 260 via the CS bus 260CS and sensor data from the sensors 610 to the processing circuit 620 or RCS bus 260RCS. The translator 610 may also transport control signals from the control bus 210 via the RCS bus 260RCS and to the system 260 via the CS bus 260CS. The translator 610 may also transport sensor data from the sensors 610 to the control bus 210 via the CS bus 260CS and the RCS bus 260RCS. The central control system 110 controls whether control signals and/or sensor data flows between the system 260 and the processing circuit 620 or between the system 260 and the control bus 210. The central control system 110 asserts signal 560, which is one signal from the plurality of remote/local signals 510, as a low value (e.g., zero) so that control signals and/or sensor data flows between the system 260 and the processing circuit 620. The central control system 110 asserts signal 560 to a high-value (e.g., 1, 3V, 5V) so that control signals and/or sensor data flows between the system 260 and the control bus 210 via the RCS bus 260RCS.

The central control system 110 asserts the remote/local signal, in this case remote/local signal 560, to a low value when the system controller 262 is functioning. The central control system 110 asserts the remote/local signal 560 to a high-value when the system controller 262 is not functional and cannot generate control signals for the system 260.

In this example embodiment, When a system controller is referred to as nonfunctional, this generally refers to the ability of the system controller to generate control signals to control its corresponding system. Since the processing circuit 620 generates the control signals and receives the sensor data, a system controller is nonfunctional when the processing circuit 620 is unable to perform its functions. When a system controller is nonfunctional because it is processing circuit 620 is nonfunctional, the corresponding system may still receive control signals from another control system via the translator 610. If a system controller is nonfunctional because it is translator 610 is nonfunctional, then no control signals may be transported to the system, from either the processing circuit 620 or the control bus 210 via the RCS bus 260RCS, so control of the corresponding system cannot be performed by another system controller because the control signals cannot reach the system via the nonfunctional translator.

The translator 610 may perform additional functions in addition to steering (e.g., transporting, directing) control signals and/or sensor data. In an example embodiment, the translator 610 performs level shifting between the system 260, the processing circuit 620 and/or the control bus 210. Level shifting may be required to match voltage levels for control of the system 260. In another example embodiment, the translator 610 amplifies signals and or currents transported between the system 260 and the processing circuit or the system 260 and the control bus 210. In another example embodiment, the translator 610 receives packets of data that describe the control signals to be sent to the system 260. The translator unpacks the packet, translates (e.g., construes, converts) the data from the packet into control signals that are sent to the system 260. The packet may include information regarding control signal levels, control signal timing, and/or the values of control signals with respect to other control signals. The translator 610 includes any type of circuit, including processing circuits, buffers, drivers, synchronous circuits, needed to unpack a packet and to produce the control signals. In another example embodiment, the control bus 210 is a synchronous bus with timeslots allocated for control signals for various systems. The translator 610 includes any type of circuit for extracting data from a timeslot and converting the data into the control signals for the system. The translator 610 may also receive sensor data from the system 260 and prepare data for a packet or a timeslot for sending to the processing circuit 620 and/or the control bus 210.

The central control system 110 controls whether the processing circuit 620 has access to the control bus 210 via the GCS bus 260GCS. The processing circuit 620 is separated from the control bus 210 by tri-state buffer 640. The central control system 110 asserts signal 566, which is one signal from the plurality of control remote signals 516, as a low value (e.g., zero) so that tri-state buffer 640 is placed in a high impedance state thereby disconnecting the GCS bus 660GCS from the GCS bus 260GCS, which couples to the control bus 210. While the tri-state buffer is in the high impedance state, the processing circuit 620 cannot drive control signals onto the GCS bus 260GCS and control bus 210. Further, the processing circuit 620 cannot receive sensor data from the control bus 210 via the GCS buses 260GCS and 660GCS. Generally, the central control system 110 sets the tri-state buffer 640 into a high impedance date when the system controller 626 does not need to provide control signals to a system other than system 260.

When the central control system 110 has determined that one or more system controllers are nonfunctional and that the system controller 262 will provide the control signals in place of one or more of the nonfunctional system controllers, then the central control system 110 enables the tri-state buffer 640 so that the processing circuit 620 may provide control signals to and receive sensor data from the control bus 210. The central control system 110 enables the tri-state buffer 640 by asserting signal 566 to a high-value so that the tri-state buffer 640 is no longer in the high impedance state thereby allowing signals from processing circuit 620 to be transported to and from the control bus 210 via GCS buses 260GCS and 660GCS.

Referring to FIG. 7, when the central control system 110 determines that a system controller is nonfunctional, the central control system 110 asserts the remote/local signal of the nonfunctional system controllers to a high-value to steer control signals and sensor data to and from the system corresponding to the nonfunctional system controller. For example, if the central control system 110 determines that the engine system controller 220 is nonfunctional, the central control system 110 sets remote/local signal 520 to a high-value. The central control system 110 also sets signal 526 to a low-value because the nonfunctional engine system controller 220 will not be generating or providing control signals to any system.

When the central control system 110 determines that a system controller is functional and is needed to provide control signals to another system, other than the system that corresponds to the functional system controller, the central control system 110 sets the control remote signal to a high-value so that the functional system controller has access to the control bus 210 to both provide control signals to and to receive sensor data from the control bus 210. As in the previous example, assume that the engine system controller 220 is nonfunctional, but the system controller 262 is functional. The central control system 110 determines that the system controller 262 will provide control signals to and receive sensor data from engine system 120. Accordingly, the central control system 110 sets remote/local 560 to a low-value so that processing circuit 620 generates and provides control signals to and receives sensor data from system 260 via the CS bus 260CS. Further, the center control system 110 sets control remote 566 to a high-value so that processing circuit 620 has access to the control bus via 660GCS and 260GCS to provide control signals to and receive sensor data from engine system 120. Further, the central control system 110 sets remote/local 520 to a high-value so that system 120 receives control signals from and provides sensor data to system controller 262 via CS bus 220CS, RCS bus 220RCS, control bus 210, and GCS bus 260GCS.

When the central control system 110 determines that the system controller 262 will generate control signals for the engine system 120, the central control system 110 accesses the memory 570 to retrieve the engine code 572. The central control system 110 transfers the engine code 572 to the processing circuit 620 of the system controller 262 via the processor communication bus 514. The processing circuit 620 stores the engine code 572 in the memory 630. The memory 630 already stores the code associated with system 260. The processing circuit 620 then executes the code associated with system 260 and engine code 572 to generate the control signals for the system 260 and the control signals for the engine system 120 respectively.

When the central control system 110 determines that a system controller will generate the control signals for a system other than the system associated with it, the central control system 110 accesses the memory 570 and provide the code needed for the system controller to generate control signals for the other system.

Peak Processing

In another example embodiment, the controller from a first system may assist the controller from a second system during a period of peak usage of the second system. In this example embodiment, the controller of the second system has not failed and is not replaced by the controller of the first system. The controller of the second system is experiencing a demand for computing power that is beyond its current real-time capacity to perform. In this situation, the controller of the first system is not operating at its maximum capacity and may cooperate with the controller of the second system to assist in performing the tasks and/or functions of the controller of the second system.

For example, assume that the engine system controller 220 is periodically requested to perform functions for the engine system 120 that are beyond its capacity to perform in real-time. Having reached its processing limit, the engine system controller 220 must delay or schedule the performance of some functions so they are not performed in real-time or near real-time. Generally, engine system controller 220 has a capacity to perform all of the functions of the engine system 120, but may perform some less critical functions in a delayed or scheduled manner rather than in real-time or near real-time.

However, in an example embodiment, when the engine system controller 220 reaches its maximum processing capacity, yet still has functions that need to be performed, the system controller from a less loaded system may perform some of the calculations and/or functions that need to be performed by the engine system controller 220. For example, the HVAC system controller 250, during the time of peak demand for the engine system controller 220, may cooperate with the engine system controller 222 perform some of the functions of the engine system controller 220 to enable the engine system controller 220 to perform all of its functions in real-time or near real-time during a period of peak demand. In this example embodiment, the HVAC system controller 250 may perform some of the functions requested by engine system controller 220 while still performing all of the functions needed by HVAC system 150.

Cooperation of system controllers in this embodiment performs load sharing between system controllers.

Afterword

The foregoing description discusses implementations (e.g., embodiments), which may be changed or modified without departing from the scope of the present disclosure as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments have been described, the scope of the invention is intended to be measured by the claims as set forth below. In the claims, the term "provided" is used to definitively identify an object that is not a claimed element but an object that performs the function of a workpiece. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

The location indicators "herein", "hereunder", "above", "below", or other word that refer to a location, whether specific or general, in the specification shall be construed to refer to any location in the specification whether the location is before or after the location indicator.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods.

What is claimed is:

1. A vehicle comprising:
   a plurality of vehicle systems, each vehicle system adapted to perform a function of the vehicle;
   a plurality of system controllers, each system controller adapted to be connected to one vehicle system respectively whereby each system controller corresponds to one vehicle system respectively, each system controller adapted to generate a first plurality of control signals respectively, each system controller is adapted to provide the first plurality of control signals respectively to its corresponding vehicle system to control an operation of its corresponding vehicle system, each system controller further adapted to generate a second plurality of control signals to control an operation of one or more other vehicle systems; and
   a control bus adapted to be connected to each vehicle system of the plurality of vehicle systems, the control bus further adapted to be connected to one or more system controllers of the plurality of system controllers, the control bus adapted to transport the second plurality of control signals from one system controller to one or more other vehicle systems of the plurality of vehicle systems; wherein:
   each system controller of the plurality of system controllers includes a tri-state buffer respectively for connecting each system controller respectively to the control bus;
   while all system controllers are functional, each system controller generates and provides the first plurality of control signals respectively to its respective vehicle system and the tri-state buffer respectively for each system controller is placed in a high impedance condition whereby the plurality of system controllers cannot access the control bus; and
   responsive to a failure of a first system controller, the tri-state buffer of a second system controller is placed in a low impedance condition, the second system controller generates and provides the second plurality of control signals to the vehicle system corresponding to the first system controller via the tri-state buffer and the control bus, whereby the second plurality of control signals control the operation of the vehicle system corresponding to the first system controller.

2. The vehicle of claim 1, wherein the second system controller further generates and provides the first plurality of control signals respective to its corresponding vehicle system.

3. The vehicle of claim 1, wherein responsive to a failure of a third system controller of the plurality of system controllers, the second system controller further generates and provides the second plurality of control signals to the vehicle system corresponding to the third system controller via the control bus whereby the second plurality of control signals further controls the operation of the vehicle system corresponding to the third system controller.

4. The vehicle of claim 3, wherein the second system controller further generates and provides the first plurality of control signals respective to its corresponding vehicle system.

5. The vehicle of claim 1, further comprising a central control system, wherein the central control system:
   detects the failure of the first system controller; and
   assigns the second system controller to generate the second plurality of control signals.

6. The vehicle of claim 1, wherein:
   each system controller of the plurality of system controllers includes a translator respectively;
   while all system controllers are functional, each system controller provides the first plurality of control signals respective to its corresponding system via its corresponding translator; and
   responsive to the failure of the first system controller, the second system controller provides the second plurality of control signals to the vehicle system corresponding to the first system controller via the control bus and the translator of the first system controller.

7. The vehicle of claim 6, further comprising a central control system, wherein the central control system:
   detects the failure of the first system controller; and
   assigns the second system controller to generate and provide the second plurality of control signals.

8. The vehicle of claim 1, further comprising a central control system, wherein the central control system:
   detects the failure of the first system controller;
   assigns the second system controller to generate and provide the second plurality of control signals; and
   controls the control bus and the tri-state buffer of the second system controller to transport the second plurality of control signals from the second system controller to the vehicle system that corresponds to the first system controller.

9. A vehicle comprising: a control bus; a first system adapted to be connected to the control bus, the first system adapted to perform a first function of the vehicle; a second system adapted to be connected to the control bus, the second system adapted to perform a second function of the vehicle; a first system controller, the first system controller includes a first translator, a first processing circuit, and a first tri-state buffer, the first system controller adapted to be connected to the first system via a first bus, the first system controller further adapted to be connected to the control bus, the first system controller adapted to provide a first plurality of control signals to the first system via the first bus, the first system controller is further adapted to provide a second plurality of control signals to the second system via the control bus, the first plurality of control signals for controlling the first system to perform the first function; a second system controller, the second system controller includes a second translator, a second processing circuit, and a second tri-state buffer, the second system controller adapted to be connected to the second system via a second bus, the second system controller further adapted to be connected to the control bus, the second system controller adapted to provide the second plurality of control signals to the second system via a second bus, the second system controller is further adapted to provide the first plurality of control signals to the first system via the control bus, the second plurality of control signals for controlling the second system to perform the second function; and a central control system, the central control system adapted to couple the first processing circuit to the first bus or the control bus to the first bus via the first translator, the second processing circuit to the second bus or the control bus to the second bus via the second translator, the first processing circuit to the control bus via the first tri-state buffer, and the second processing circuit to the control bus via the second tri-state buffer; wherein: while all system controllers are functional, the central control system controls the first translator and the second translator to connect the first processing circuit to the first bus and the second processing circuit to the second bus respectively, whereby the first processing circuit provides the first plurality of control signals to the first system via the first bus and second processing circuit provides the second plurality of control signals to the second system via the second bus; while all system controllers are functional, the central control system further controls the first tri-state buffer and the second tri-state buffer to disconnect the first processing circuit from the control bus and the second processing circuit from the control bus respectively, whereby no control signal is provided via the control bus; responsive to a failure of the first system controller, the second system controller provides the second plurality of control signals to the second system via the second bus and the first plurality of control signals to the first system via the control bus and the first bus; and responsive to a failure of the second system controller, the first system controller provides the first plurality of control signals to the first system via the first bus and the second plurality of control signals to the second system via the control bus and the second bus.

10. The vehicle of claim 9, wherein while all system controllers are functional, the first system controller and the second system controller generate only the first plurality of control signals and the second plurality of control signals respectively.

11. The vehicle of claim 9, wherein the central control system is adapted to detect the failure of the first system controller or the second system controller.

12. The vehicle of claim 9, wherein:
the central control system is adapted to control access to the control bus, the first bus, and the second bus; and while all system controllers are functional, the central control system prevents the first system controller and the second system controller from driving the control bus.

13. The vehicle of claim 9, wherein:
the central control system is adapted to control access to the control bus, the first bus, and the second bus; and responsive to the failure of the first system controller, the central control system enables the second system controller to drive the first plurality of control signals onto the control bus and the control bus to drive the first bus.

14. The vehicle of claim 9, wherein:
the central control system is adapted to control access to the control bus, the first bus, and the second bus; and responsive to the failure of the second system controller, the central control system enables the first system controller to drive the second plurality of control signals onto the control bus and the control bus to drive the second bus.

15. The vehicle of claim 9, wherein:
responsive to the failure of the first system controller, the central control system controls the first translator and the second translator to connect the control bus to the first bus and the second processing circuit to the second bus respectively, whereby the second processing circuit provides the second plurality of control signals to the second system via the second bus; and
responsive to the failure of the first system controller, the central control system further controls the first tri-state buffer and the second tri-state buffer to disconnect the first processing circuit from the control bus and to connect the second processing circuit to the control bus respectively whereby the second processing circuit provides the first plurality of control signals to the first system via the control bus and the first bus.

16. The vehicle of claim 9, wherein:
responsive to the failure of the second system controller, the central control system sets the first translator and the second translator to connect the first processing circuit to the first bus and the control bus to the second bus respectively, whereby the first processing circuit provides the first plurality of control signals to the first system via the first bus; and
responsive to the failure of the second system controller, the central control system further controls first tri-state buffer and the second tri-state buffer to connect the first processing circuit to the control bus and to disconnect the second processing circuit from the control bus whereby the first processing circuit provides the second plurality of control signals to the second system via the control bus and the second bus.

17. A vehicle comprising:
a first system adapted to perform a first function of the vehicle in response to a first plurality of control signals;
a second system adapted to perform a second function of the vehicle in response to a second plurality of control signals;
a control bus adapted to transport the first plurality of control signals and the second plurality of control signals to the first system or the second system;
a central control system;
a first system controller that includes a first translator, a first processing circuit, a first bus, and a first tri-state buffer, wherein the first translator couples to the first processing circuit, the control bus, the first bus and the central control system, wherein the first tri-state buffer couples to the first processing circuit, the control bus and the central control system; and a second system controller that includes a second translator, a second processing circuit, a second bus, and a second tri-state buffer, wherein the second translator couples to the second processing circuit, the control bus, the second bus and the central control system, wherein the second tri-state buffer couples to the second processing circuit, the control bus and the central control system; wherein:

the central control system is adapted to control access to the control bus, the first bus, and the second bus; and while all system controllers are functional, the central control system sets the first translator to couple the first processing circuit to the first bus, the second translator to couple the second processing circuit to the second bus, the first tri-state buffer to disconnect the first processing circuit from the control bus, and the second tri-state buffer to disconnect the second processing circuit from the control bus, whereby the first processing circuit provides the first plurality of control signals to the first system via the first bus, the second processing circuit provides the second plurality of control signals to the second system via the second bus, and the control bus does not transport the first plurality of control signals or the second plurality of control signals.

* * * * *